United States Patent
Yang et al.

(10) Patent No.: US 11,743,899 B2
(45) Date of Patent: Aug. 29, 2023

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Kijun Kim, Seoul (KR); Joonkui Ahn, Seoul (KR); Jiwon Kang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 17/321,068

(22) Filed: May 14, 2021

(65) Prior Publication Data

US 2021/0360615 A1    Nov. 18, 2021

Related U.S. Application Data

(60) Provisional application No. 63/025,916, filed on May 15, 2020.

(51) Int. Cl.
| | |
|---|---|
| *H04L 5/00* | (2006.01) |
| *H04L 27/26* | (2006.01) |
| *H04W 72/21* | (2023.01) |
| *H04W 72/0446* | (2023.01) |

(52) U.S. Cl.
CPC .......... *H04W 72/21* (2023.01); *H04L 5/0007* (2013.01); *H04L 5/0048* (2013.01); *H04L 27/2613* (2013.01); *H04W 72/0446* (2013.01)

(58) Field of Classification Search
CPC .......... H04W 72/0413; H04W 72/0446; H04L 5/0007; H04L 5/0048; H04L 27/2613
USPC ........................................... 370/229
See application file for complete search history.

(56) References Cited

U.S. PATENT DOCUMENTS

| | | | |
|---|---|---|---|
| 2019/0052422 A1* | 2/2019 | Yin ................... | H04W 72/0406 |
| 2019/0159193 A1* | 5/2019 | Zhang ................. | H04L 5/0048 |
| 2020/0213057 A1* | 7/2020 | Bala .................... | H04L 5/0023 |
| 2021/0044981 A1* | 2/2021 | Bhattad ............... | H04L 27/2607 |

* cited by examiner

*Primary Examiner* — Ricardo H Castaneyra
*Assistant Examiner* — Xuan Lu
(74) *Attorney, Agent, or Firm* — Fish & Richardson P.C.

(57) ABSTRACT

The present disclosure relates to a wireless communication system, and more particularly, to a method including multiplexing UCI symbols and PTRS symbols to generate a block of modulation symbols; spreading the block of modulation symbols based on an orthogonal sequence with a spreading factor M to provide a length-L spread modulation symbol sequence, wherein the block of modulation symbols includes L/M modulation symbols, and L is a number 12 of subcarriers in a resource block; discrete fourier transforming the length-L spread modulation symbol sequence to provide a length-L complex-valued symbol sequence; transmitting the length-L complex-valued symbol sequence through an OFDM-based symbol for a PUCCH, and an apparatus therefor.

3 Claims, 10 Drawing Sheets

METHOD AND APPARATUS FOR TRANSMITTING/RECEIVING WIRELESS SIGNAL IN WIRELESS COMMUNICATION SYSTEM

CROSS-REFERENCE TO RELATED APPLICATION

This application claims the benefit of U.S. provisional Patent Application No. 63/025,916, filed on May 15, 2020, which is hereby incorporated by reference as if fully set forth herein.

BACKGROUND

Field

The present disclosure relates to a wireless communication system, and more particularly, to a method and apparatus for transmitting and receiving a wireless signal.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

In a first aspect of the present disclosure, a method used by a user equipment (UE) in a wireless communication system is provided, wherein the method comprises: multiplexing uplink control information (UCI) symbols and phase tracking reference signal (PTRS) symbols to generate a block of modulation symbols; spreading the block of modulation symbols based on an orthogonal sequence with a spreading factor M to provide a length-L spread modulation symbol sequence, wherein the block of modulation symbols includes L/M modulation symbols, and L is a number 12 of subcarriers in a resource block; discrete fourier transforming the length-L spread modulation symbol sequence to provide a length-L complex-valued symbol sequence; transmitting the length-L complex-valued symbol sequence through an orthogonal frequency division multiplexing (OFDM)-based symbol for a physical uplink control channel (PUCCH).

In a second aspect of the present disclosure, a user equipment (UE) used in a wireless communication system is provided, wherein the UE includes at least one radio frequency (RF) units, at least one processor, and at least one computer memory operably coupled to the at least one processor and, when executed, causing the at least one processor to perform operations. The operations include: multiplexing uplink control information (UCI) symbols and phase tracking reference signal (PTRS) symbols to generate a block of modulation symbols; spreading the block of modulation symbols based on an orthogonal sequence with a spreading factor M to provide a length-L spread modulation symbol sequence, wherein the block of modulation symbols includes L/M modulation symbols, and L is a number 12 of subcarriers in a resource block; discrete fourier transforming the length-L spread modulation symbol sequence to provide a length-L complex-valued symbol sequence; transmitting the length-L complex-valued symbol sequence through an orthogonal frequency division multiplexing (OFDM)-based symbol for a physical uplink control channel (PUCCH).

In a third aspect of the present disclosure, an apparatus for a UE is provided, wherein the apparatus includes at least one processor, and at least one computer memory operably coupled to the at least one processor and, when executed, causing the at least one processor to perform operations. The operations include: multiplexing uplink control information (UCI) symbols and phase tracking reference signal (PTRS) symbols to generate a block of modulation symbols; spreading the block of modulation symbols based on an orthogonal sequence with a spreading factor M to provide a length-L spread modulation symbol sequence, wherein the block of modulation symbols includes L/M modulation symbols, and L is a number 12 of subcarriers in a resource block; discrete fourier transforming the length-L spread modulation symbol sequence to provide a length-L complex-valued symbol sequence; transmitting the length-L complex-valued symbol sequence through an orthogonal frequency division multiplexing (OFDM)-based symbol for a physical uplink control channel (PUCCH).

In a fourth aspect of the present disclosure, a computer-readable storage medium including at least one computer program which, when executed, causes at least processor to perform operations is provided. The operations include: multiplexing uplink control information (UCI) symbols and phase tracking reference signal (PTRS) symbols to generate a block of modulation symbols; spreading the block of modulation symbols based on an orthogonal sequence with a spreading factor M to provide a length-L spread modulation symbol sequence, wherein the block of modulation symbols includes L/M modulation symbols, and L is a number 12 of subcarriers in a resource block; discrete fourier transforming the length-L spread modulation symbol sequence to provide a length-L complex-valued symbol sequence; transmitting the length-L complex-valued symbol sequence through an orthogonal frequency division multiplexing (OFDM)-based symbol for a physical uplink control channel (PUCCH).

In a fifth aspect of the present disclosure, a method used by a base station (BS) in a wireless communication system is provided, wherein the method includes: receiving length-L complex-valued symbol sequence through an orthogonal frequency division multiplexing (OFDM)-based symbol for a physical uplink control channel (PUCCH); inverse discrete fourier transforming the length-L complex-valued symbol sequence to provide a length-L spread modulation symbol sequence; de-spreading the length-L spread modulation symbol sequence based on an orthogonal sequence with a spreading factor M to provide a block of modulation symbols, wherein the block of modulation symbols includes L/M modulation symbols, and L is a number 12 of subcarriers in a resource block; and de-multiplexing the block of modulation symbols into uplink control information (UCI) symbols and phase tracking reference signal (PTRS) symbols.

In a sixth aspect of the present disclosure, a BS used in a wireless communication system is provided, wherein the BS includes at least one radio frequency (RF) units, at least one processor, and at least one computer memory operably coupled to the at least one processor and, when executed, causing the at least one processor to perform operations. The operations include: receiving length-L complex-valued symbol sequence through an orthogonal frequency division multiplexing (OFDM)-based symbol for a physical uplink control channel (PUCCH); inverse discrete fourier transforming the length-L complex-valued symbol sequence to provide a length-L spread modulation symbol sequence; de-spreading the length-L spread modulation symbol sequence based on an orthogonal sequence with a spreading factor M to provide a block of modulation symbols, wherein the block of modulation symbols includes L/M modulation symbols, and L is a number 12 of subcarriers in a resource block; and de-multiplexing the block of modulation symbols into uplink control information (UCI) symbols and phase tracking reference signal (PTRS) symbols.

The length-L spread modulation symbol sequence may be configured as follows:

| Index | 0 | 1 | 2 | 3 | 4 | 5 | 6 | 7 | 8 | 9 | 10 | 11 |
|---|---|---|---|---|---|---|---|---|---|---|---|---|
| Symbol | U0 | U1 | R0 | R1 | U2 | U3 | U0 | U1 | R0 | R1 | U2 | U3 |
| OCC element | C0 | C0 | C0 | C0 | C0 | C0 | C1 | C1 | C1 | C1 | C1 | C1 | wherein Ux represents x-th UCI symbol, Rx represent x-th PTRS symbol, and Cx represent x-th element of the orthogonal sequence.

The length-L spread modulation symbol sequence may be configured as follows:

| Index | 0 | 1 | 2 | 3 | 4 | 5 | 6 | 7 | 8 | 9 | 10 | 11 |
|---|---|---|---|---|---|---|---|---|---|---|---|---|
| Symbol | U0 | U1 | U2 | U3 | R0 | R1 | R0 | R1 | U0 | U1 | U2 | U3 |
| OCC element | C0 | C0 | C0 | C0 | C0 | C0 | C1 | C1 | C1 | C1 | C1 | C1 | wherein Ux represents x-th UCI symbol, Rx represent x-th PTRS symbol, and Cx represent x-th element of the orthogonal sequence.

The length-L spread modulation symbol sequence may be configured as follows:

| Index | 0 | 1 | 2 | 3 | 4 | 5 | 6 | 7 | 8 | 9 | 10 | 11 |
|---|---|---|---|---|---|---|---|---|---|---|---|---|
| Symbol | U0 | U1 | U2 | U3 | U4 | R0 | R0 | U0 | U1 | U2 | U3 | U4 |
| OCC element | C0 | C0 | C0 | C0 | C0 | C0 | C1 | C1 | C1 | C1 | C1 | C1 | wherein Ux represents x-th UCI symbol, Rx represent x-th PTRS symbol, and Cx represent x-th element of the orthogonal sequence.

The length-L spread modulation symbol sequence may be configured as follows:

| Index | 0 | 1 | 2 | 3 | 4 | 5 | 6 | 7 | 8 | 9 | 10 | 11 |
|---|---|---|---|---|---|---|---|---|---|---|---|---|
| Symbol | U0 | R0 | U1 | U0 | R0 | U1 | U0 | R0 | U1 | U0 | R0 | U1 |
| OCC element | C0 | C0 | C0 | C1 | C1 | C1 | C2 | C2 | C2 | C3 | C3 | C3 | wherein Ux represents x-th UCI symbol, Rx represent x-th PTRS symbol, and Cx represent x-th element of the orthogonal sequence.

According to the present disclosure, a wireless signal may be transmitted and received efficiently in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
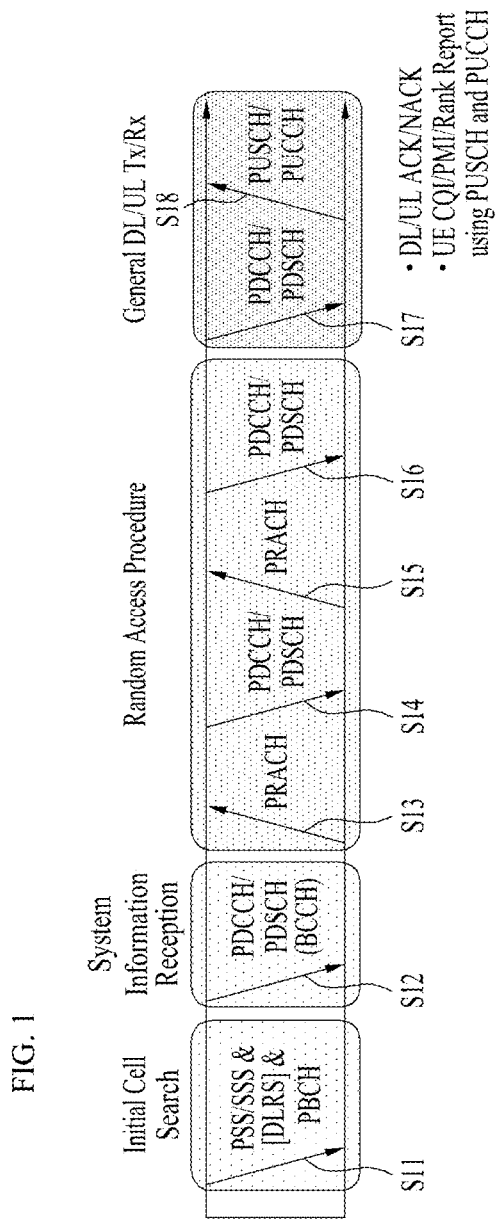
FIG. 1 illustrates physical channels used in a 3rd generation partnership project (3GPP) system as an exemplary wireless communication systems and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S11. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

The UE may perform a random access procedure to access the BS in steps S13 to S16. For random access, the UE may transmit a preamble to the BS on a physical random access channel (PRACH) (S13) and receive a response message for preamble on a PDCCH and a PDSCH corresponding to the PDCCH (S14). In the case of contention-based random access, the UE may perform a contention resolution procedure by further transmitting the PRACH (S15) and receiving a PDCCH and a PDSCH corresponding to the PDCCH (S16).

After the foregoing procedure, the UE may receive a PDCCH/PDSCH (S17) and transmit a physical uplink shared channel (PUSCH)/physical uplink control channel (PUCCH) (S18), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
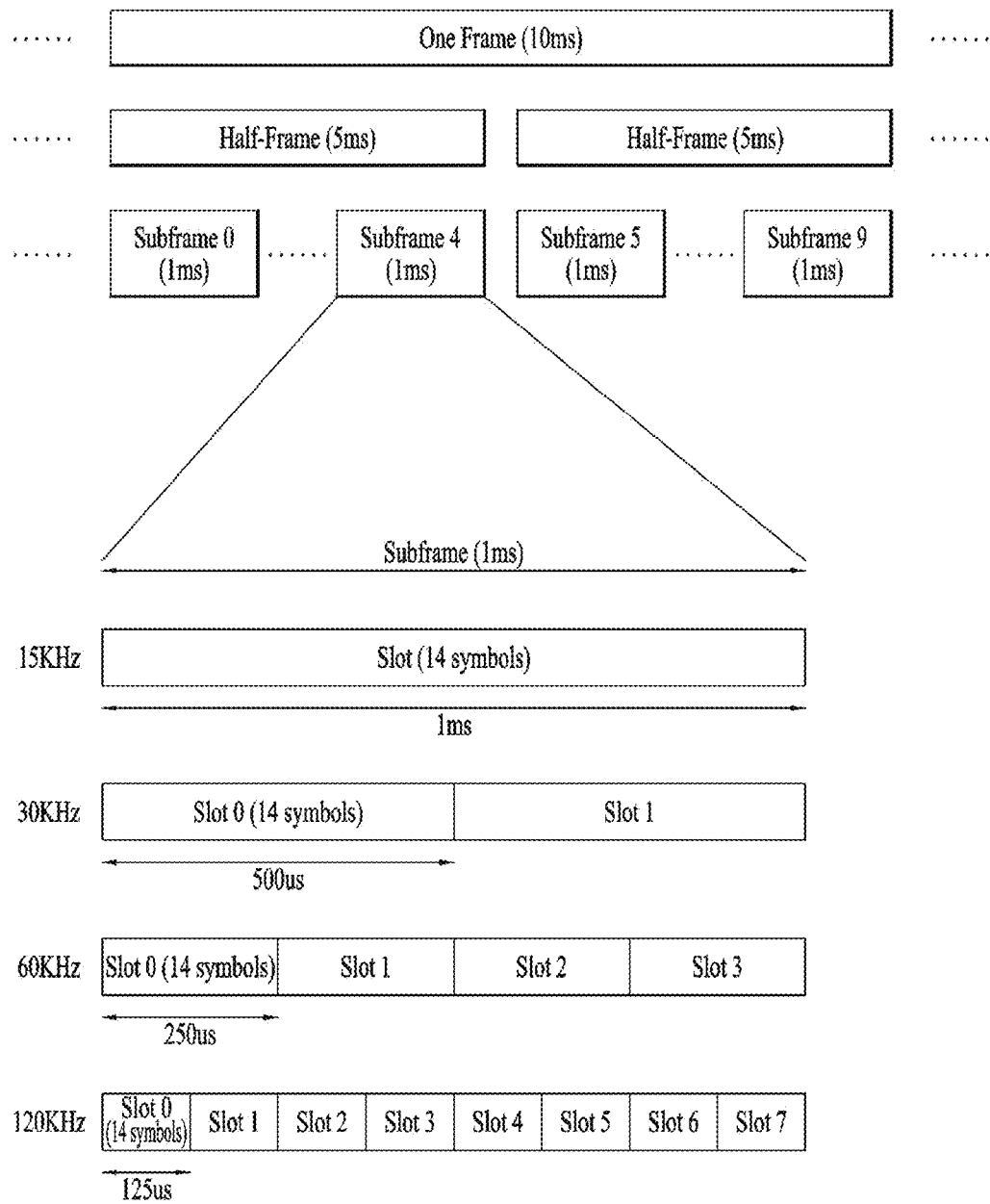
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 14 | 40 | 4 |

The frame structure is merely an example. The number of subframes, the number of slots, and the number of symbols in a frame may vary.

In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol).

In NR, various numerologies (or SCSs) are supported to support various 5G services. For example, with an SCS of 15 kHz, a wide area in traditional cellular bands is supported, while with an SCS of 30 kHz/60 kHz, a dense urban area, a lower latency, and a wide carrier bandwidth are supported. With an SCS of 60 kHz or higher, a bandwidth larger than 24.25 GHz is be supported to overcome phase noise.

An NR frequency band may be defined by two types of frequency ranges, FR1 and FR2. FR1 and FR2 may be configured as described in Table 3. FR2 may refer to millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
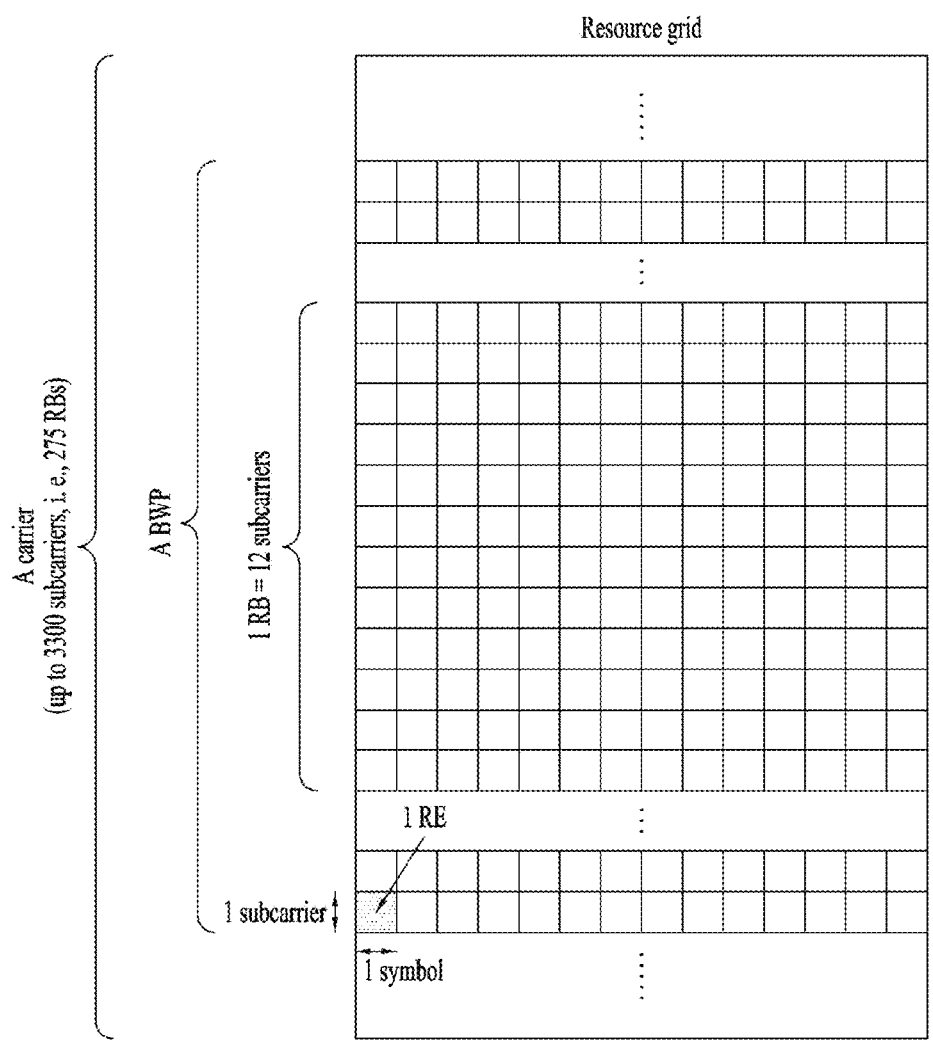
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
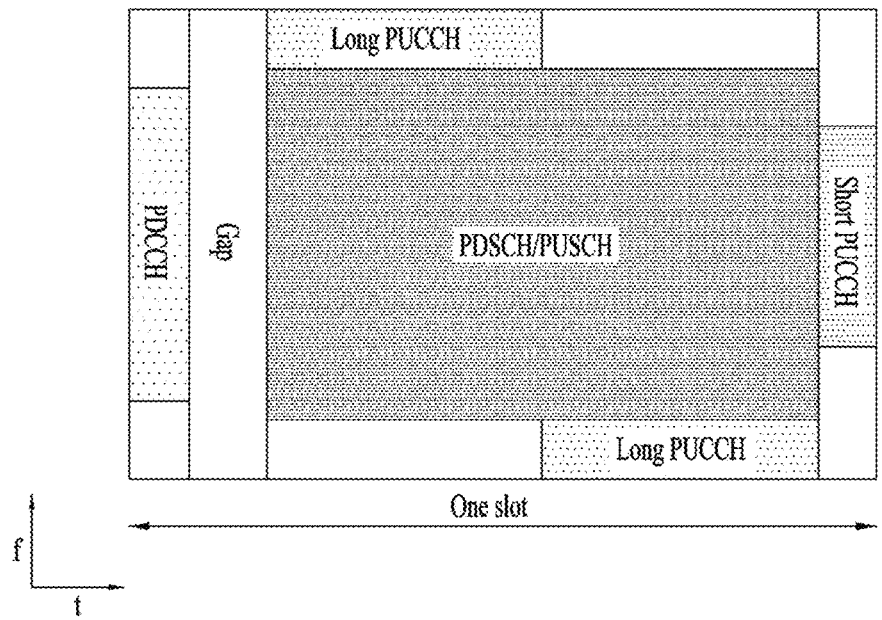
FIG. 4 illustrates mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols of a slot may be used for a DL control channel (e.g., PDCCH) (hereinafter, referred to as a DL control region), and the last M symbols of the slot may be used for a UL control channel (e.g., PUCCH) (hereinafter, referred to as a UL control region). Each of N and M is an integer equal to or larger than 0. A resource area (referred to as a data region) between the DL control region and the UL control region may be used for transmission of DL data (e.g., PDSCH) or UL data (e.g., PUSCH). A guard period (GP) provides a time gap for switching between a transmission mode and a reception mode at the BS and the UE. Some symbol at the time of switching from DL to UL may be configured as a GP.

The PDCCH carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., radio network temporary identifier (RNTI)) according to the owner or usage of the PDCCH. For example, if the PDCCH is for a specific UE, the CRC will be masked with a UE identifier (e.g., cell-RNTI (C-RNTI)). If the PDCCH is for paging, the CRC will be masked with a paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

The PUCCH carries uplink control information (UCI). The UCI includes the following information.

Scheduling Request (SR): Information that is used to request a UL-SCH resource.

Hybrid Automatic Repeat Request (HARQ)-Acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.

Channel State Information (CSI): Feedback information about a downlink channel. Multiple input multiple output (MIMO)-related feedback information includes a rank indicator (RI) and a precoding matrix indicator (PMI).

Table 4 exemplarily shows PUCCH formats. PUCCH formats may be divided into short PUCCHs (Formats 0 and 2) and long PUCCHs (Formats 1, 3, and 4) based on the PUCCH transmission duration.

TABLE 4

| PUCCH format | Length in OFDM symbols $N^{PUCCH}_{symb}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

Figure 5:
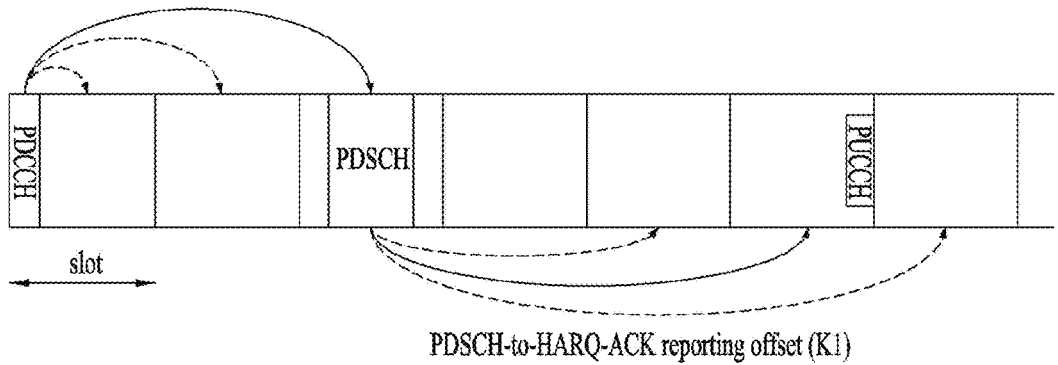
FIG. 5 illustrates an acknowledgment/negative acknowledgement (ACK/NACK) transmission process.

FIG. 5 illustrates an ACK/NACK transmission procedure. Referring to FIG. 5, the UE may detect a PDCCH in slot #n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment (FDRA): Indicates an RB set assigned to the PDSCH.

Time domain resource assignment (TDRA): Indicates K0 and the starting position (e.g. OFDM symbol index) and duration (e.g. the number of OFDM symbols) of the PDSCH in a slot. TDRA may be indicated by a start and length indicator value (SLIV).

PDSCH-to-HARQ feedback timing indicator: Indicates K1.

HARQ process number (4 bits): Indicates an HARQ process identify (ID) for data (e.g., PDSCH or TB).

PUCCH resource indicator (PRI): Indicates PUCCH resources to be used for UCI transmission among a plurality of resources in a PUCCH resource set.

After receiving the PDSCH in slot #(n+K0) according to the scheduling information of slot #n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes HARQ-ACK responses to the plurality of PDSCHs.

Figure 6:
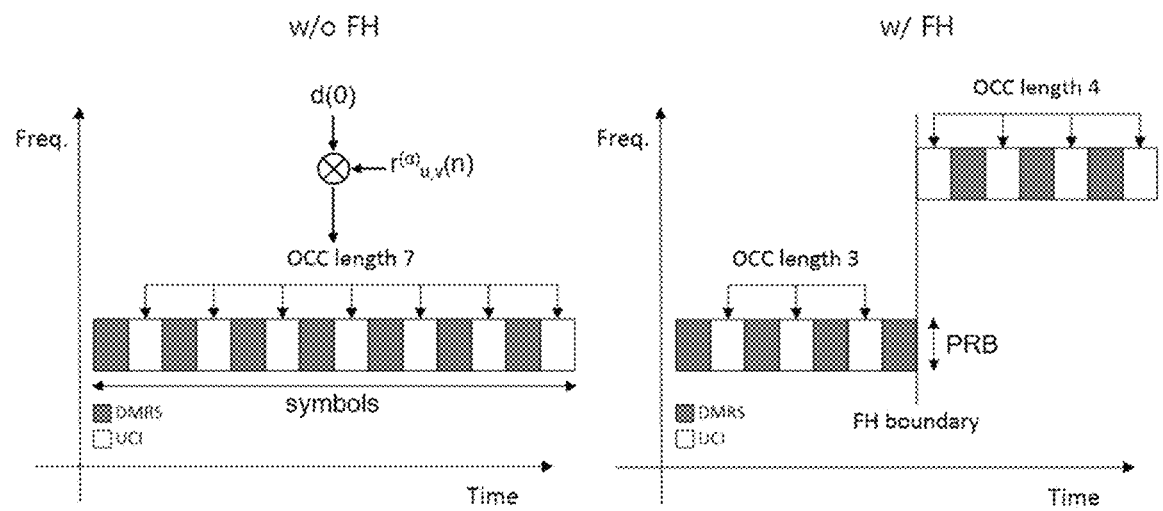
FIG. 6 illustrates a physical uplink control channel (PUCCH) format 1.

FIG. 6 illustrates a physical uplink control channel (PUCCH) format 1.

Referring to FIG. 6, a block of bits $b(0), \ldots, b(M_{bit}-1)$ may be modulated using binary phase shift keying (BPSK) if $M_{bit}=1$ and quadrature phase shift keying (QPSK) if $M_{bit}=$, resulting in a complex-valued symbol $d(0)$. The complex-valued symbol $d(0)$ is multiplied with a sequence $r_{u,v}^{(\alpha)}(n)$ according to $$y(n) = d(0) \cdot r_{u,v}^{(\alpha)}(n), n = 0, 1, \ldots, N_{sc}^{RB}-1 \quad \text{Equation 1}$$

where $r_{u,v}^{(\alpha)}(n)$ is defined by a cyclic shift $\alpha$ of a base sequence (e.g., zadoff-chu sequence) with a group number u and a based sequence number v within the group u. $N_{sc}^{RB}$ is the number of subcarriers (e.g., 12) in a resource block (RB).

whether the frequency-hop distance is zero or not, otherwise no intra-slot frequency hopping is assumed.

The orthogonal sequence $w_i(m)$ is given by Table 6 where i is the index of the orthogonal sequence to use. In case of a PUCCH transmission spanning multiple slots, the complex-valued symbol $d(0)$ is repeated for the subsequent slots.

TABLE 5

Number of PUCCH symbols and the corresponding $N^{PUCCH,1}_{SF,m'}$.

| PUCCH length, $N^{PUCCH,1}_{symb}$ | $N^{PUCCH,1}_{SF,m'}$ | | |
|---|---|---|---|
| | No intra-slot hopping | Intra-slot hopping | |
| | m' = 0 | m' = 0 | m' = 1 |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

TABLE 6

Orthogonal sequences $w_i(m) = e^{j2\pi\phi(m)/N^{PUCCH,1}_{SF,m'}}$ for PUCCH format 1.

| $N^{PUCCH,1}_{SF,m'}$ | $\varphi$ | | | | | | |
|---|---|---|---|---|---|---|---|
| | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

The block of complex-valued symbols $y(0), \ldots, y(N_{sc}^{RB}-1)$ is block-wise spread with the orthogonal sequence $w_i(m)$ according to $$z(m'N_{sc}^{RB}N_{SF,0}^{PUCCH,1} + mN_{sc}^{RB} + n) = w_i(m) \cdot y(n) \quad \text{Equation 2}$$

$n = 0, 1, \ldots, N_{sc}^{RB} - 1$ $m = 0, 1, \ldots, N_{SF,m'}^{PUCCH,1} - 1$ $m' = \begin{cases} 0 & \text{no intra-slot frequency hopping} \\ 0, 1 & \text{intra-slot frequency hopping enabled} \end{cases}$ where $N_{SF,m'}^{PUCCH,1}$ is given by Table 5. Intra-slot frequency hopping is assumed when the higher-layer parameter intraSlotFrequencyHopping is provided, regardless of The sequence $z(n)$ is multiplied with the amplitude scaling factor $\beta_{PUCCH,1}$ in order to conform to the transmit power and mapped in sequence starting with $z(n)$ to resource elements $(k,l)_{p,\mu}$ which meet all of the following criteria:
they are in the resource blocks assigned for transmission,
they are not used by the associated DM-RS The mapping to resource elements $(k,l)_{p,\mu}$ not reserved for other purposes is in increasing order of first the (subcarrier) index k over the assigned physical resource block, and then the (symbol) index l. In a symbol, the subcarrier index can be replaced with a resource element (RE) index.

Figure 7:
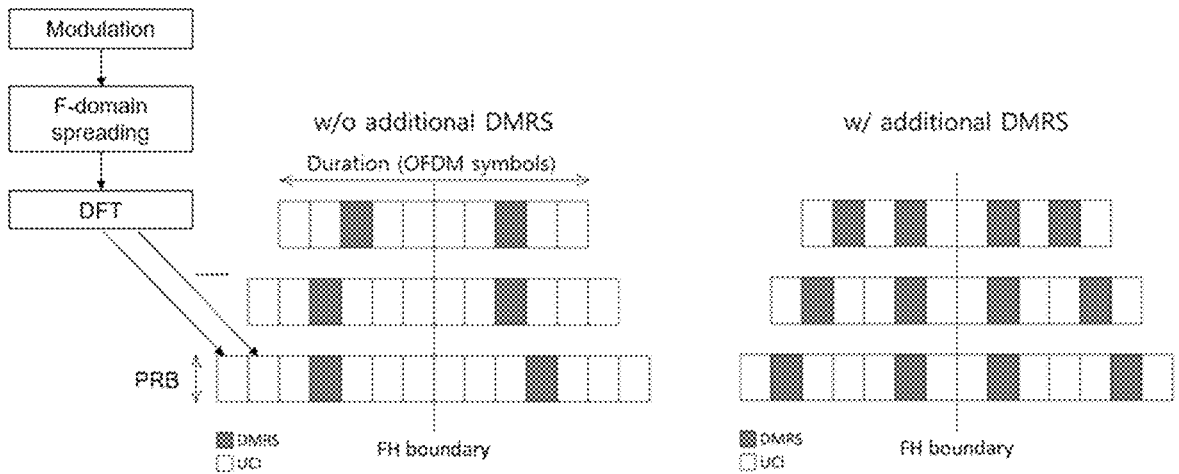
FIG. 7 illustrates a PUCCH format 4.

FIG. 7 illustrates a PUCCH format 4.

Referring to FIG. 7, a block of bits $b(0), \ldots, b(M_{bit}-1)$ is modulated using QPSK unless $\pi/2$-BPSK is configured, resulting in a block of complex-valued modulation symbols $d(0), \ldots, d(M_{symb}-1)$ where $M_{symb}=M_{bit}/2$ for QPSK and $M_{symb}=M_{bit}$ for $\pi/2$-BPSK.

For PUCCH format 4, block-wise spreading is applied according to $$y(lM_{sc}^{PUCCH,4}+k)=$$
$$w_n(k)\cdot d\left(l\frac{M_{sc}^{PUCCH,4}}{N_{SF}^{PUCCH,4}}+k\bmod\frac{M_{sc}^{PUCCH,4}}{N_{SF}^{PUCCH,4}}\right)$$
$$k=0,1,\ldots,M_{sc}^{PUCCH,4}-1$$
$$l=0,1,\ldots,(N_{SF}^{PUCCH,4}M_{symb}/M_{sc}^{PUCCH,4})-1$$

Equation 3 where $M_{sc}^{PUCCH,4}=12$, $N_{SF}^{PUCCH,4}\in\{2,4\}$ and orthogonal sequences $w_n$ are given by Tables 7 and 8 where n is the index of the orthogonal sequence to use.

TABLE 7

$w_n(m)$ when $N^{PUCCH,4}{}_{SF}=2$ (i.e., spreading factor = 2).

| n | $w_n$ |
|---|---|
| 0 | [+1 +1 +1 +1 +1 +1 +1 +1 +1 +1 +1 +1] |
| 1 | [+1 +1 +1 +1 +1 +1 −1 −1 −1 −1 −1 −1] |

TABLE 8

$w_n(m)$ when $N^{PUCCH,4}{}_{SF}=4$ (i.e., spreading factor = 4).

| n | $w_n$ |
|---|---|
| 0 | [+1 +1 +1 +1 +1 +1 +1 +1 +1 +1 +1 +1] |
| 1 | [+1 +1 +1 −j −j −j −1 −1 −1 +j +j +j] |
| 2 | [+1 +1 +1 −1 −1 −1 +1 +1 +1 −1 −1 −1] |
| 3 | [+1 +1 +1 +j +j +j −1 −1 −1 −j −j −j] |

The block of complex-valued symbols $y(0),\ldots,y(N_{SF}^{PUCCH,s}M_{symb}-1)$ is transform precoded according to $$z(l\cdot M_{sc}^{PUCCH,s}+k)=\frac{1}{\sqrt{M_{sc}^{PUCCH,s}}}$$
$$\sum_{m=0}^{M_{sc}^{PUCCH,s}-1}y(l\cdot M_{sc}^{PUCCH,s}+m)e^{-j\frac{2\pi mk}{M_{sc}^{PUCCH,s}}}$$
$$k=0,\ldots,M_{sc}^{PUCCH,s}-1$$
$$l=0,1,\ldots,(N_{SF}^{PUCCH,s}M_{symb}/M_{sc}^{PUCCH,s})-1$$

Equation 4 resulting in a block of complex-valued symbols $z(0),\ldots,z(N_{SF}^{PUCCH,s}M_{symb}-1)$, wherein s represents a PUCCH format (e.g., s=4 for PUCCH format 4).

The block of modulation symbols $z(0),\ldots,z(N_{SF}^{PUCCH,s}M_{symb}-1)$ is multiplied with the amplitude scaling factor $\beta_{PUCCH,s}$ in order to conform to the transmit power and mapped in sequence starting with z(0) to resource elements $(k,l)_{p,\mu}$ which meet all of the following criteria:
they are in the resource blocks assigned for transmission,
they are not used by the associated DM-RS The mapping to resource elements $(k,l)_{p,\mu}$ not reserved for other purposes is be in increasing order of first the (subcarrier) index k over the assigned physical resource blocks, and then the (symbol) index l. In a symbol, the subcarrier index can be replaced with a resource element (RE) index.

In case of intra-slot frequency hopping, $\lfloor N_{symb}^{PUCCH,s}/2\rfloor$ OFDM symbols shall be transmitted in the first hop and $N_{symb}^{PUCCH,s}-\lfloor N_{symb}^{PUCCH,s}/2\rfloor$ symbols in the second hop where $N_{symb}^{PUCCH,s}$ is the total number of OFDM symbols used in one slot for PUCCH transmission.

Figure 8:
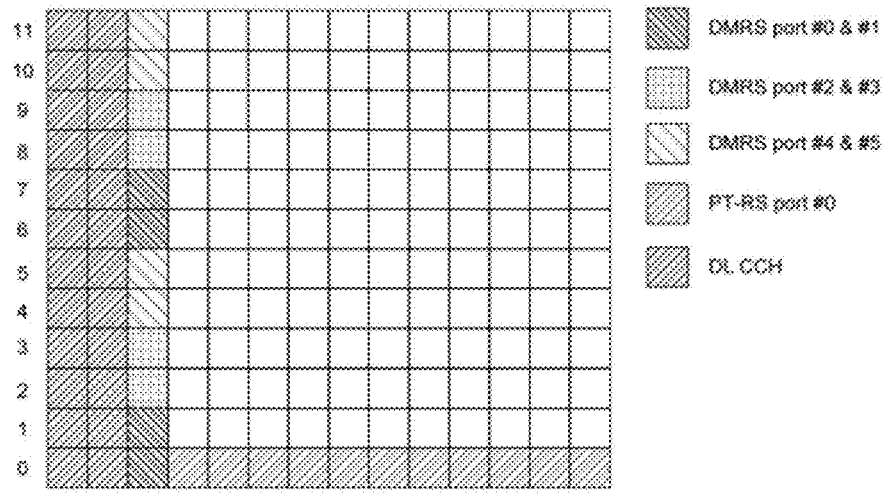
FIG. 8 illustrates a phase tracking reference signal (PTRS)

FIG. 8 illustrates a phase tracking reference signal (PTRS) for PDSCH. Phase noise may distort time domain transmitted/received signals. The phase noise causes common phase error (CPE) and inter carrier interference (ICI) in frequency domain. Based on the PTRS transmission, CPE can be estimated and compensated.

Referring to FIG. 8, the PTRS for subcarrier k is given by $$r_k=r(2m+k')$$

Equation 5 where $r(2m+k')$ is the demodulation reference signal at (symbol) position $l_0$ and subcarrier k If PTRS is present in the resource blocks used for the PDSCH, the UE shall assume the PDSCH PTRS is scaled by a factor $\beta_{PTRS,i}$ to conform with the transmission power and mapped to resource elements $(k,l)_{p,\mu}$ according to $$a_{k,l}^{(p,\mu)}=\beta_{PTRS,i}r_k$$

Equation 6 when all the following conditions are fulfilled
l is within the OFDM symbols allocated for the PDSCH transmission
resource element $(k,l)_{p,\mu}$ is not used for DM-RS, non-zero-power CSI-RS, zero-power CSI-RS, SS/PBCH block, a detected PDCCH The set of time indices l defined relative to the start of the PDSCH allocation is defined by
1. set i=0 and $l_{ref}=0$
2. if any symbol in the interval $\max(l_{ref}+(i-1)L_{PT-RS}+1, l_{ref}),\ldots,l_{ref}+iL_{PT-RS}$ overlaps with a symbol used for DM-RS
   set i=1
   set $l_{ref}$ to the symbol index of the DM-RS symbol in case of a single-symbol DM-RS and to the symbol index of the second DM-RS symbol in case of a double-symbol DM-RS
   repeat from step 2 as long as $l_{ref}+iL_{PT-RS}$ is in side the PDSCH allocation
3. add $l_{ref}+iL_{PT-RS}$ to the set of time indices for PT-RS
4. increment i by one
5. repeat from step 2 above as long as $l_{ref}+iL_{PT-RS}$ is inside the PDSCH allocation
where $L_{PT-RS}\in\{1,2,4\}$.

For the purpose of PTRS mapping, the resource blocks allocated for PDSCH transmission are numbered from 0 to $N_{RB}-1$ from the lowest scheduled resource block to the highest. The corresponding subcarriers in this set of resource blocks are numbered in increasing order starting from the lowest frequency from 0 to $N_{sc}^{RB}N_{RB}-1$. $N_{sc}^{RB}$ is the number of subcarriers (e.g., 12) in one RB, and $N_{RB}$ is the number of scheduled RBs.

The subcarriers to which the UE assumes the PTRS is mapped are given by $$k=k_{ref}^{RE}+(iK_{PT-RS}+k_{ref}^{RB})N_{sc}^{RB}$$

Equation 7

$$k_{ref}^{RB}=\begin{cases}n_{RNTI}\bmod K_{PT-RS} & \text{if }N_{FB}\bmod K_{PT-RS}=0\\ n_{RNTI}\bmod(N_{FB}\bmod K_{PT-RS}) & \text{otherwise}\end{cases}$$

where
i=0, 1, 2, ...
$k_{ref}^{RE}$ is given by Table 9 for the DM-RS port associated with the PTRS port. If the higher-layer parameter resourceElementOffset in the PTRS-DownlinkConfig IE is not configured, the column corresponding to 'offset00' is be used.

$n_{RNTI}$ is the RNTI associated with the DCI scheduling the transmission $N_{RB}$ is the number of resource blocks scheduled $K_{PT-RS} \in \{2,4\}$.

TABLE 9

The parameter $k^{RE}_{ref}$

| DM-RS antenna port P | DM-RS Configuration type 1 resourceElementOffset | | | | DM-RS Configuration type 2 resourceElementOffset | | | |
|---|---|---|---|---|---|---|---|---|
| | offset00 | offset01 | offset10 | offset11 | offset00 | offset01 | offset10 | offset11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

Furthermore, although not commonly used in urban areas, PTRS can also be utilized for PUSCH transmission. Specifically, if transform precoding (e.g., DFT) is enabled, the phase-tracking reference signal $r_m(m')$ to be mapped in position in before transform precoding, where m depends on the number of PTRS groups $N_{group}^{PT-RS}$ (e.g., 2, 4, 8), the number of samples per PTRS group $N_{samp}^{group}$ according to Table 10, is generated according to $$r_m(m') = w(k') \frac{e^{j\frac{\pi}{2}(m\,mod\,2)}}{\sqrt{2}} [(1 - 2c(m')) + j(1 - 2c(m'))] \quad \text{Equation 8}$$

$$m' = N_{samp}^{group} s' + k'$$

$$s' = 0, 1, \ldots, N_{group}^{PT-RS} - 1$$

$$k' = 0, 1, N_{samp}^{group} - 1$$

where c(i) is a pseudo-random sequence and w(i) is given by Table 10.

TABLE 10

The orthogonal sequence w(i).

| $n_{RNTI} \bmod N_{samp}^{group}$ | $N_{samp}^{group} = 2$ [w(0) w(1)] | $N_{samp}^{group} = 4$ [w(0) w(1) w(2) w(3)] |
|---|---|---|
| 0 | [+1 +1] | [+1 +1 +1 +1] |
| 1 | [+1 −1] | [+1 −1 +1 −1] |
| 2 | — | [+1 +1 −1 −1] |
| 3 | — | [+1 −1 −1 +1] |

The sequence $r_m(m')$ is multiplied by β' and mapped to $N_{samp}^{group} N_{group}^{PT-RS}$ complex valued symbols in $\tilde{x}^{(0)}(m)$ where $\tilde{x}^{(0)}(m)$ are the complex-valued symbols in OFDM symbol l before transform precoding, m is described above, and β' is an offset value. In OFDM symbol l before transform precoding, PTRS groups $N_{group}^{PT-RS}$ are placed on non-contiguous indexes m, and $N_{samp}^{group}$ samples in each PTRS group are placed on contiguous m indexes m.

After transforming precoding, PTRS is transmitted through in the resource blocks and OFDM symbols used for the PUSCH.

Example: Phase Noise Reduction in Control Channel

Until recently (over 3GPP Rel-15 and Rel-16), 3GPP has been standardizing on a 5G system named New RAT (NR). The NR system aims to support multiple logical networks in a single physical system, and for this purpose, is designed so as to support services with various requirements (e.g., eMBB, mMTC, URLLC) by operating/changing various OFDM numerology (e.g., OFDM symbol duration, SCS, CP length), wide operating frequency range (up to about 50 GHz), and analog/hybrid beamforming operations in consideration of the characteristics of the high frequency band can be operated/changed.

On the other hand, in recent years, the necessity of developing an NR (hereinafter, HF-NR) system operating in a high frequency (HF) band, which is higher than the existing NR system based on 3GPP Rel-15/16, is considered (for targeting Rel-17 and beyond). In the case of the HF-NR system, with relative to the SCS of the existing NR (e.g., 15 KHz, 30 KHz, 60 KHz, 120 KHz), an introduction/application of a new OFDM numerology based on a large SCS (e.g., 240 KHz, 480 KHz, 960 KHz) can be considered, considering the wireless channel characteristics such as a higher frequency and a wider bandwidth compared to the existing NR, and wireless channel characteristics such as larger phase noise and larger Doppler shift due to the high frequency band. In addition, in an operating environment of the HF-NR system, phase noise effect may be greater than that of the existing NR system due to the characteristics of the high frequency band. Accordingly, performance degradation may occur in signal transmission using a high MCS level as well as signal transmission using a low MCS level.

Hereinafter, in the present disclosure, a PTRS configuration/mapping and phase noise handling method for PUCCH transmission are proposed. Specifically, the present disclosure proposes a PTRS configuration/transmission suitable for PUCCH format 4 and a phase noise handling method suitable for PUCCH format 1. In the present disclosure, PTRS may be replaced with another RS (e.g., Demodulation Reference Signal, DMRS).

In this disclosure, the HF-NR system is an example for explaining a communication environment having a large phase noise effect, and the proposal of the present disclosure is not limited to the HF-NR system. The proposal of the present disclosure can be applied to any environment requiring a phase noise handling. For example, the proposed operation of the present disclosure may be adaptively applied based on an operating frequency range (of a cell). For example, the operation (e.g., FIGS. 6-7) defined in the existing NR may be applied in a low frequency range (e.g., below 60 GHz), and the proposed operation (e.g., FIGS. 11-13) of the present disclosure may be applied in a high frequency range (e.g., above 60 GHz). In addition, in low SCS (e.g., 15 KHz, 30 KHz, 60 KHz, 120 KHz; e.g., 120 KHz or less), the operation (e.g., FIGS. 6-7) defined in the existing NR can be applied, and large SCS (e.g., 240 KHz, 480 KHz, 960 KHz; e.g., 240 KHz or more), the proposed operation (e.g., FIGS. 11-13) of the present disclosure may be applied. Here, the SCS may mean the SCS of a cell or a channel (e.g., PUCCH).

Figure 9:
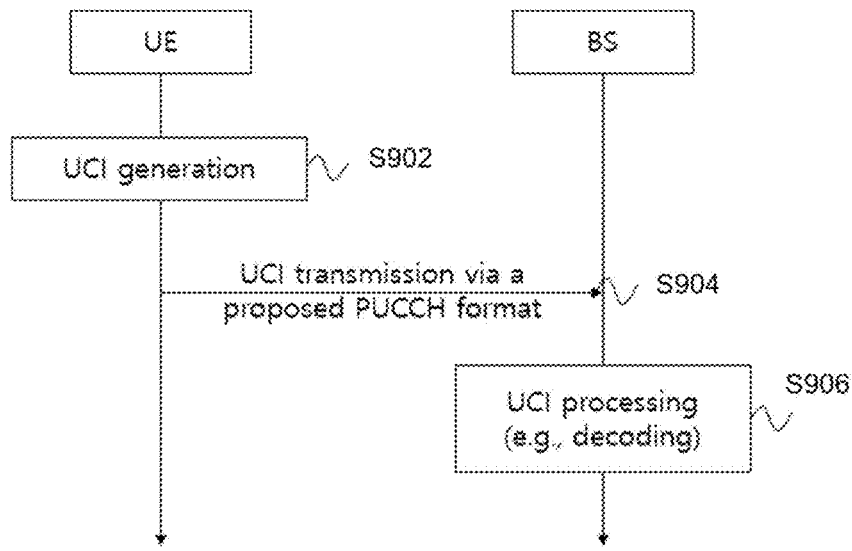
FIGS. 9 and 10 illustrate signal transmission procedures according to an example of the present disclosure.

FIG. 9 illustrates a signal transmission according to an example of the present invention. Referring to FIG. 9, the UE may generate a UCI (S902). The UCI may include HARQ-ACK, CSI, and/or SR. Then, the UE may transmit the UCI using a PUCCH format proposed in the present disclosure (S904). The BS may process the UCI after receiving the UCI through the PUCCH from the UE (S906). The UCI processing may include UCI decoding.

Figure 10:
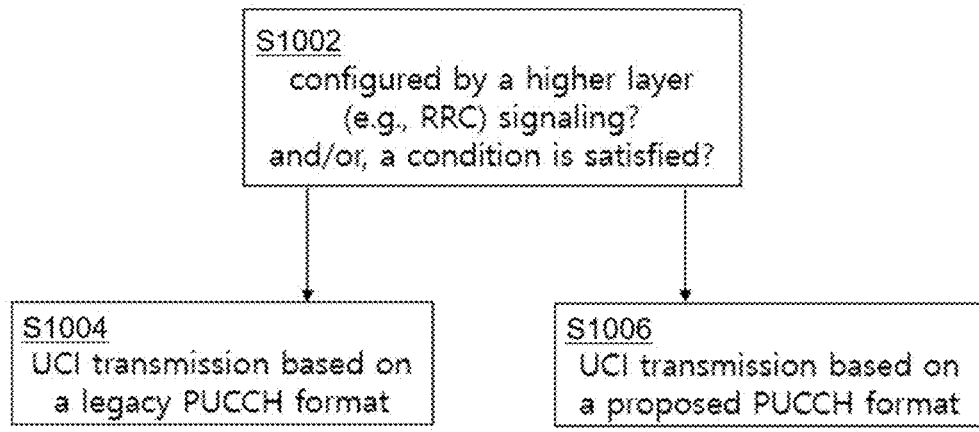

FIG. 10 illustrates a signal transmission according to an example of the present invention. Referring to FIG. 10, the UE may perform a PUCCH resource determination process for UCI transmission as a part of the UCI transmission process. Here, determining the PUCCH resource may include determining a PUCCH resource/format for UCI transmission. In order to determine the PUCCH format, the UE may check whether the PUCCH format is configured by higher layer (e.g., RRC) signaling and/or whether a predetermined condition is satisfied (S1002). The predetermined condition may include, for example, an operating frequency range of a cell (or the UE), and/or a subcarrier spacing (range) of a cell (or a channel). Based on the PUCCH format determination, the UE may transmit UCI using a legacy PUCCH format (S1004) or using a PUCCH format proposed in the present disclosure (S1006). For example, when a predetermined condition includes the operating frequency range of the cell (or UE), the existing PUCCH format (e.g., FIGS. 6-7) is used in a low frequency range (e.g., below 60 GHz), and the proposed PUCCH format (e.g., FIGS. 11-13) of the present disclosure may be used in a high frequency range (e.g., above 60 GHz). In addition, when a predetermined condition includes the SCS of the cell (or channel (e.g., PUCCH)), the existing PUCCH format (e.g., FIGS. 6-7) is used in low SCS (e.g., 15 KHz, 30 KHz, 60 KHz, 120 KHz; e.g., 120 KHz or less). and the proposed operation (e.g., FIGS. 11-13) of the present disclosure can be used in large SCS (e.g., 240 KHz, 480 KHz, 960 KHz; e.g., 240 KHz or more).

(1) PTRS Configuration/Transmission Method Suitable for PUCCH Format 4

In case of PUCCH format 4, a pre-DFT orthogonal cover code (OCC) of length-2 (or, spreading factor (SF)=2) or length-4 (or, SF=4) is applied (i.e., applying OCC in a time sample domain before a transform precoding (e.g., DFT)), whereby multiplexing between a plurality of UEs may be supported (see, FIG. 7). The OCC may be also referred as an orthogonal code/sequence or a spreading code/sequence. First, when length-2 OCC is applied, the coded/modulated UCI symbol mapped to 12 REs (on a virtual frequency domain before the transform precoding) in one PRB and the OCC (sequence) structure applied thereto are as shown in Table 11. Here, U having different indexes mean different UCI symbols. In addition, C having different indexes means different code elements in the OCC sequence (index) (e.g., [C0, C1]=[+1, +1] for OCC index 0, and [C0, C1]=[+1, −1] for OCC index 1) (see, Table 7). Accordingly, a length-2 OCC may be applied between U having the same index.

TABLE 11 block-wise (length-2) OCC based PUCCH format 4 structure
(OFDM symbol-level before transform precoding)

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | U2 | U3 | U4 | U5 | U0 | U1 | U2 | U3 | U4 | U5 |
| OCC element | C0 | C0 | C0 | C0 | C0 | C0 | C1 | C1 | C1 | C1 | C1 | C1 |

Looking at the PTRS structure applied to the DFT-s-OFDM-based PUSCH transmission defined in the current NR system, the minimum number of PTRS REs per PTRS group (i.e., consecutive PTRS RE sets) is 2, and the minimum number of PTRS groups is two. In consideration of this, in order to minimize PTRS overhead in PUCCH format 4 transmission using a single PRB, the methods proposed below can be applied to the length-2 OCC-based PUCCH format 4 transmission.

In the following, Us having different indexes represent different UCI symbols. Similarly, Rs with different indexes represent different PTRS symbols. Here, the UCI/PTRS symbol corresponds to a modulation symbol, or a complex value corresponding to a modulation symbol. C having different indexes means different code elements in the OCC sequence (index). For convenience, Ux represents x-th UCI symbol, Rx represent x-th PTRS symbol, and Cx represent x-th element of OCC. UCI and PTRS may share the same OCC or not. For example, an OCC index of PTRS follows an OCC index of UCI. Also, an OCC for UCI and an OCC for PTRS may be defined/assigned separately/independently. For convenience, an OCC for UCI and an OCC for PTRS are all collectively represented as C.

For convenience, the present disclosure shows an OFDM symbol-level structure (before transform precoding (e.g., DFT)) of PUCCH format 4. The proposed structure is also applied to other OFDM symbols of PUCCH format 4. For different OFDM symbols, different coded/modulated UCI symbols may be mapped/used. In the below description related to PUCCH format 4, an RE index may correspond to a sample index in a time sample domain or an RE/subcarrier index in a virtual frequency domain, before transform precoding (e.g., DFT). RE index may be replaced as a (time domain) sample index or a (virtual) subcarrier index.

TABLE 12

Method 1-1

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | R0 | R0 | U2 | U3 | U0 | U1 | R1 | R1 | U2 | U3 |
| OCC element | C0 | C0 | C0 | C1 | C0 | C0 | C1 | C1 | C0 | C1 | C1 | C1 |

Here, UCI and PTRS may share the same OCC or not. In this structure, OCC is applied to contiguous PTRS REs (time samples), and so is suitable for a heavy time varying phase noise environment.

TABLE 13

Method 1-2

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | R0 | R1 | U2 | U3 | U0 | U1 | R0 | R1 | U2 | U3 |
| OCC element | C0 | C0 | C0 | C0 | C0 | C0 | C1 | C1 | C1 | C1 | C1 | C1 |

Here, UCI and PTRS may share the same OCC or not. If the UCI and PTRS share the same OCC, the overall OCC pattern is same as the conventional PUCCH format 4, whereby the conventional signal processing related to OCC can be applied without any modification. Therefore signal processing can be simplified even though PTRS is multiplexed on a PUCCH. Further, in this structure, OCC is applied to non-contiguous PTRS REs (time samples), and so is able to average time varying phases.

Alternatively, another methods can be further considered, in which a combination of {the number of PTRS groups, the number of PTRS REs per each PTRS group} is given as {1, 4} or {1, 2}, as shown below.

TABLE 14

Method 2-1

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | U2 | U3 | R0 | R0 | R1 | R1 | U0 | U1 | U2 | U3 |
| OCC element | C0 | C0 | C0 | C0 | C0 | C1 | C0 | C1 | C1 | C1 | C1 | C1 |

Here, UCI and PTRS may share the same OCC or not. Similar to Method 1-1, it is able to average time varying phases estimated based on R0 and R1.

TABLE 15

Method 2-2

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | U2 | U3 | R0 | R1 | R0 | R1 | U0 | U1 | U2 | U3 |
| OCC element | C0 | C0 | C0 | C0 | C0 | C0 | C1 | C1 | C1 | C1 | C1 | C1 |

Here, UCI and PTRS may share the same OCC or not. If the UCI and PTRS share the same OCC, the overall OCC pattern is same as the conventional PUCCH format 4, whereby the conventional signal processing related to OCC can be applied without any modification. Therefore signal processing can be simplified even though PTRS is multiplexed on a PUCCH. Further, it is able to provide a similar effect to Method 2-1.

TABLE 16

Method 2-3

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | U2 | U3 | U4 | R0 | R0 | U0 | U1 | U2 | U3 | U4 |
| OCC element | C0 | C0 | C0 | C0 | C0 | C0 | C1 | C1 | C1 | C1 | C1 | C1 |

Here, UCI and PTRS may share the same OCC or not. If the UCI and PTRS share the same OCC, the overall OCC pattern is same as the conventional PUCCH format 4, whereby the conventional signal processing related to OCC can be applied without any modification. Therefore signal processing can be simplified even though PTRS is multiplexed on a PUCCH. Further, it is able to provide a similar effect to Method 1-1.

Alternatively, another methods can be further considered, in which a combination of {the number of PTRS groups, the number of PTRS REs per each PTRS group} is given as {2, 1} or {4, 1}, as shown below (distributed RE set structure).

TABLE 17

Method 3-1

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | U2 | R0 | U3 | U4 | U0 | U1 | R0 | U2 | U3 | U4 |
| OCC element | C0 | C0 | C0 | C0 | C0 | C0 | C1 | C1 | C1 | C1 | C1 | C1 |

Here, UCI and PTRS may share the same OCC or not. If the UCI and PTRS share the same OCC, the overall OCC pattern is same as the conventional PUCCH format 4, whereby the conventional signal processing related to OCC can be applied without any modification. Therefore signal processing can be simplified even though PTRS is multiplexed on a PUCCH. Further, it is able to provide a similar effect to Method 1-2.

TABLE 18

Method 3-2

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | R0 | U1 | U2 | R1 | U3 | U0 | R0 | U1 | U2 | R1 | U3 |
| OCC element | C0 | C0 | C0 | C0 | C0 | C0 | C1 | C1 | C1 | C1 | C1 | C1 |

Here, UCI and PTRS may share the same OCC or not. If the UCI and PTRS share the same OCC, the overall OCC pattern is same as the conventional PUCCH format 4, whereby the conventional signal processing related to OCC can be applied without any modification. Therefore signal processing can be simplified even though PTRS is multiplexed on a PUCCH. Further, it is able to provide a similar effect to Method 1-2.

Meanwhile, in case of length-4 OCC based PUCCH format 4 transmission, UCI symbols which is mapped to 12 (virtual) REs in a PRB and OCC sequence structure applied to the UCI symbols are shown in Table 19. A length-4 OCC may be defines as: [C0, C1, C2, C3]=[+1, +1, +1, +1], [+1, −j, −1, +j], [+1, −1, +1, −1], [+1, +j, −1, −j] (see, Table 8).
s

TABLE 19 block-wise (length-4) OCC based PUCCH format 4 structure

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | U2 | U0 | U1 | U2 | U0 | U1 | U2 | U0 | U1 | U2 |
| OCC element | C0 | C0 | C0 | C1 | C1 | C1 | C2 | C2 | C2 | C3 | C3 | C3 |

In this case, the below methods can be considered, in which a combination of {the number of PTRS groups, the number of PTRS REs per each PTRS group} is given as {2, 2} or {1, 4}, as shown below. In case of {the number of PTRS groups, the number of PTRS REs per each PTRS group}={2, 2}, which is corresponding to method 4-1, a length-4 OCC is applied over four PTRS REs in different PTRS groups.

TABLE 20

Method 4-1

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | R0 | R0 | U0 | U1 | U0 | U1 | R0 | R0 | U0 | U1 |
| OCC element | C0 | C0 | C0 | C1 | C1 | C1 | C2 | C2 | C2 | C3 | C3 | C3 |

Here, UCI and PTRS may share the same OCC or not. If the UCI and PTRS share the same OCC, the overall OCC pattern is same as the conventional PUCCH format 4, whereby the conventional signal processing related to OCC can be applied without any modification. Therefore signal processing can be simplified even though PTRS is multiplexed on a PUCCH. Further, it is able to provide a similar effect to Method 1-2.

TABLE 21

Method 4-2

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | U0 | U1 | R0 | R0 | R0 | R0 | U0 | U1 | U0 | U1 |
| OCC element | C0 | C0 | C1 | C1 | C0 | C1 | C2 | C3 | C2 | C2 | C3 | C3 |

Here, UCI and PTRS may share the same OCC or not. Further, it is able to provide a similar effect to Method 1-1.

Alternatively, another methods can be further considered, in which a combination of {the number of PTRS groups, the number of PTRS REs per each PTRS group} is given as {4, 1}, as shown below (distributed RE set structure).

TABLE 22

Method 5-1

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U1 | R0 | U0 | R0 | U1 | U0 | R0 | U1 | R0 | U0 | U1 |
| OCC element | C0 | C0 | C0 | C1 | C1 | C1 | C2 | C2 | C2 | C3 | C3 | C3 |

Here, UCI and PTRS may share the same OCC or not. If the UCI and PTRS share the same OCC, the overall OCC pattern is same as the conventional PUCCH format 4, whereby the conventional signal processing related to OCC can be applied without any modification. Therefore signal processing can be simplified even though PTRS is multiplexed on a PUCCH. Further, it is able to provide a similar effect to Method 1-2.

TABLE 23

Method 5-2

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | R0 | U1 | U0 | R0 | U1 | U0 | R0 | U1 | U0 | R0 | U1 |
| OCC element | C0 | C0 | C0 | C1 | C1 | C1 | C2 | C2 | C2 | C3 | C3 | C3 |

Here, UCI and PTRS may share the same OCC or not. If the UCI and PTRS share the same OCC, the overall OCC pattern is same as the conventional PUCCH format 4, whereby the conventional signal processing related to OCC can be applied without any modification. Therefore signal processing can be simplified even though PTRS is multiplexed on a PUCCH. Further, it is able to provide a similar effect to Method 1-2.

If PTRS REs are additionally mapped to PUCCH format 4 according to the above proposed methods, each PUCCH format 4 resource (simply, PUCCH resource) is defined/assigned as a combination including at least the following parameters: 1) OCC index applied to UCI REs, 2) OCC index applied to PTRS REs, and/or 3) cyclic shift value applied to DMRS sequence. Each PUCCH format 4 resource may also include 4) PRB index. Meanwhile, for the same PUCCH format 4 resource, an OCC index for UCI and an OCC index for PTRS may be defined/assigned as a same value. For example, an OCC index for PTRS may be defined/configured to follow an OCC index for UCI.

Figure 11:
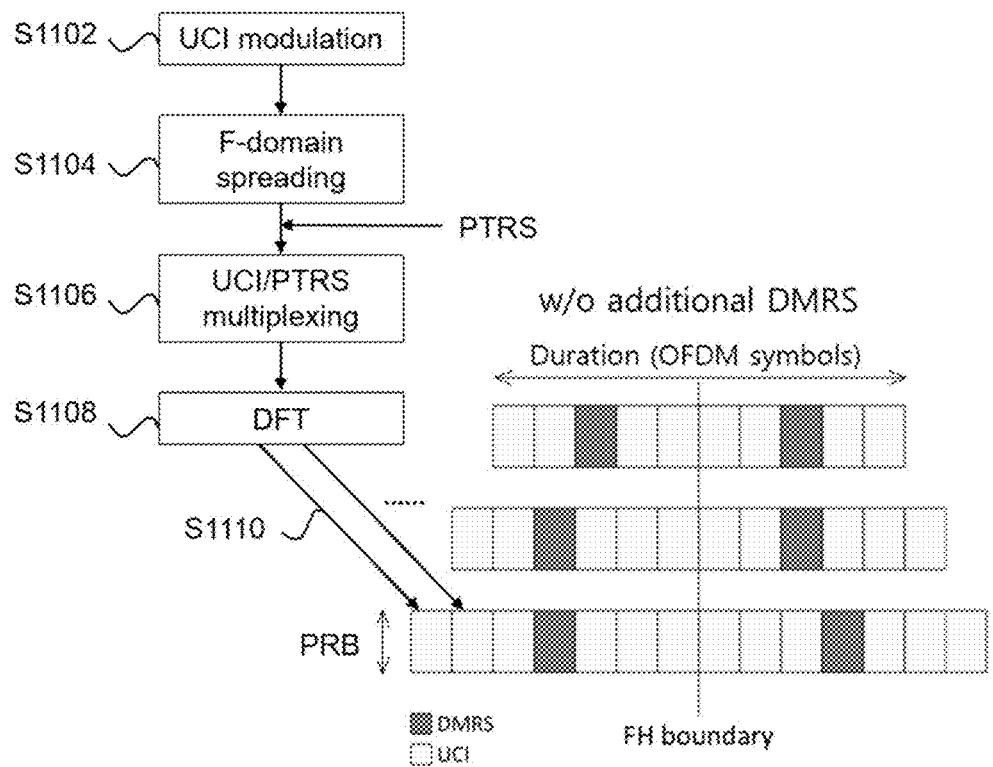
FIGS. 11 to 13 illustrate proposed PUCCH formats according to an example of the present disclosure.

FIG. 11 illustrates a signal processing for PUCCH format 4 according to an example of the present invention. FIG. 11 may be understood as a part of S1006 of FIG. 10.

Referring to FIG. 11, the UE may generate UCI (S1102). The UCI may include HARQ-ACK information about a downlink data (e.g., PDSCH) (and, optionally SR and/or CSI). Then, the UE may perform a (virtual) frequency (F)-domain spreading to UCI modulation symbols (S1104). Then, the UE may multiplexes the spread UCI symbols and (spread) PTRS symbols into a time domain samples corresponding to OFDM symbol(s) (S1106). Then, the UE may perform a DFT process per N time domain samples (S1108), and the resultant samples are consecutively mapped to OFDM symbol(s) in a PRB assigned for PUCCH format 4 transmission, in an increasing order of first subcarrier (or RE) index, and then OFDM symbol index (S1110). Here, N is the number of subcarriers in one PRB (e.g., 12). Except the step of multiplexing (S1106), basic procedures are same as the conventional procedure. Thus detailed procedures can be referred to the explanations regarding FIG. 7. For example, for the Ph OFDM symbol, the block of complex-valued symbols y(n)(n=l*12+k; k=0, 1, . . . , 11) can be replaced with the results of Methods 1-1, 2-1 and 4-2 (i.e., Tables 12, 14 and 21). For example, in method 1-1, y(n) may be given as (S1106): [U0*C0, U1*C0, R0*C0, R0*C1, U2*C0, U3*C0, U0*C1, U1*C1, R0*C0, R0*C1, U2*C1, U3*C1].

Figure 12:
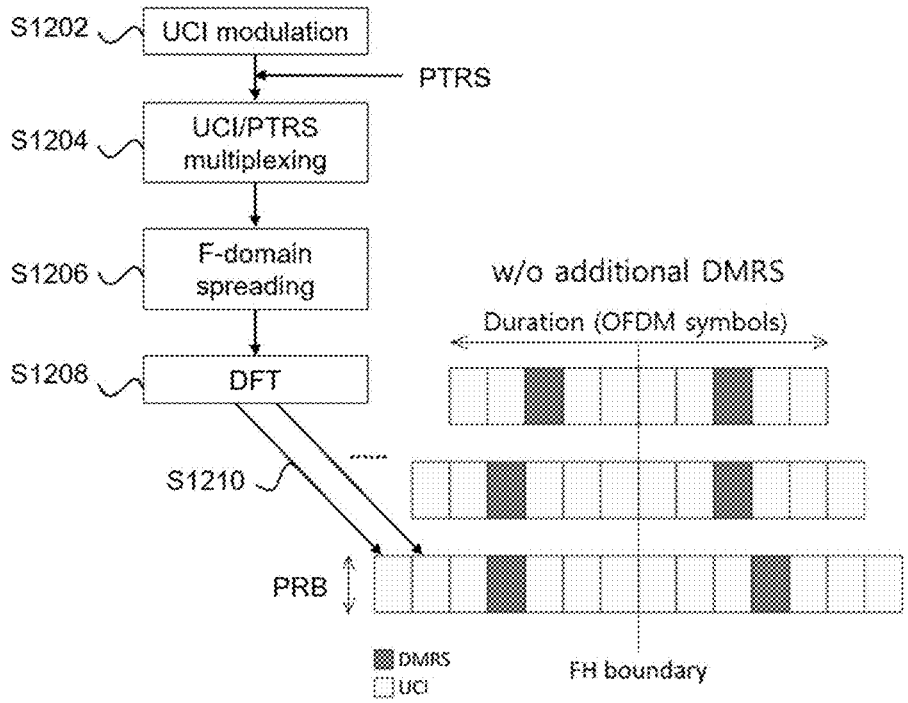

FIG. 12 illustrates another signal processing for PUCCH format 4 according to an example of the present invention. FIG. 12 may be understood as a part of S1006 of FIG. 10.

Referring to FIG. 12, the UE may generate UCI (S1202). The UCI may include HARQ-ACK information about a downlink data (e.g., PDSCH) (and, optionally SR and/or CSI). Then, the UE may multiplexes UCI symbols and PTRS symbols into a time domain samples corresponding to OFDM symbol(s) (S1204). Then, the UE may perform a (virtual) frequency (F)-domain spreading to the multiplexed UCI and PTRS symbols (S1206). Then, the UE may perform a DFT process per N time domain samples (S1208), and the resultant samples are consecutively mapped to OFDM symbol(s) in a PRB assigned for PUCCH format 4 transmission, in an increasing order of first subcarrier (or RE) index, and then OFDM symbol index (S1210). Here, N is the number of subcarriers in one PRB (e.g., 12). Except the step of multiplexing (S1204), basic procedures are same as the conventional procedure. Thus detailed procedures can be referred to the explanations regarding FIG. 7. For example, for the $1^{th}$ OFDM symbol, the block of complex-valued symbols d(n)(n=l*12+k; k=0, 1, . . . 11) can be replaced with the results of Methods 1-2, 2-2 to 4-1, 5-1 and 5-2 (i.e., Tables 13, 15 to 20, 22 and 23). For example, in method 1-2, d(n) may be given as (S1204): [U0, U1, R0, R0, U2, U3, U0, U1, R0, R0, U2, U3], and then y(n) may be obtained as (S1206) (see, Equation 4): [U0*C0, U1*C0, R0*C0, R0*C0, U2*C0, U3*C0, U0*C1, U1*C1, R0*C1, R0*C1, U2*C1, U3*C1].

Meanwhile, for example, for the reasons of inter-UE interference/power imbalance, channel frequency/time selectivity, frequency offset, inter-carrier interference handling and the like, with regarding PUCCH transmission, an UE may be configured from a BS whether to apply a block-wise pre-DFT OCC as proposed in the above methods or a sample-wise pre-DFT OCC in exemplified in tables 24-25.

TABLE 24 sample-wise (length-2) OCC based PUCCH format 4 structure

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U0 | U1 | U1 | U2 | U2 | U3 | U3 | U4 | U4 | U5 | U5 |
| OCC element | C0 | C1 | C0 | C1 | C0 | C1 | C0 | C1 | C0 | C1 | C0 | C1 |

TABLE 25 sample-wise (length-4) OCC based PUCCH format 4 structure

| | OFDM symbol before transform precoding (e.g., DFT) | | | | | | | | | | | |
|---|---|---|---|---|---|---|---|---|---|---|---|---|
| RE index | 0 | 1 | 2 | 3 | 4 | 5 | 6 | 7 | 8 | 9 | 10 | 11 |
| UCI symbol | U0 | U0 | U0 | U0 | U1 | U1 | U1 | U1 | U2 | U2 | U2 | U2 |
| OCC element | C0 | C1 | C2 | C3 | C0 | C1 | C2 | C3 | C0 | C1 | C2 | C3 |

(2) Phase Noise Handling Method Suitable for PUCCH Format 1

The PUCCH format 1 may be considered as a format supporting multiplexing between multiple UEs, by applying a time-domain (T-D) OCC across OFDM symbols (i.e., OCC is applied at the OFDM symbol level in the time domain). Meanwhile, according to a proposed PUCCH format 1, a symbol to which a UCI signal is mapped/transmitted and a symbol to which a DMRS signal is mapped/transmitted may be configured in a form of alternating each other on a time axis. Separate/independent T-D OCCs may be applied to UCI symbol group and DMRS symbol group, respectively.

Meanwhile, in case of the existing PUCCH format 1, it is a form defined so to apply a single OCC sequence (to each of the UCI symbol and the DMRS symbol) over the entire PUCCH duration (or, if frequency hopping is configured, each hop duration). In this case, a CDM symbol group size to which OCC is applied and an OCC length corresponding thereto may have a structure that is fixedly determined according to a PUCCH (or hop) duration. For example, in the case of PUCCH format 1 consisting of a total of 8 symbols, the DMRS symbol and the UCI symbol may be alternating as shown in Table 26. In this case, a length-4 OCC is applied to each of 4 DMRS symbol groups (size=4) and 4 UCI symbol groups (size=4).

TABLE 26 symbol-level (length-4) OCC based PUCCH format 1 structure

| | OFDM symbol index | | | | | | | |
|---|---|---|---|---|---|---|---|---|
| | 0 | 1 | 2 | 3 | 4 | 5 | 6 | 7 |
| UCI (U) or DMRS (R) | R | U | R | U | R | U | R | U |
| OCC element | C0 | C0 | C1 | C1 | C2 | C2 | C3 | C3 |

Thus, in the HF-NR system, in consideration of the phase noise effect, for PUCCH format 1, (i) CDM symbol group size (to which OCC is applied) applied to a given PUCCH (or hop) duration, or (ii) OCC length size (corresponding to the CDM symbol group size) may be configured (by the BS) (as a value smaller than the existing size and length automatically determined by PUCCH (or hop) duration). For example, for a PUCCH format 1 composed of a total of 8 symbols as described above, it may be possible to set/apply a CDM symbol group size=2 or an applied OCC length=2 as in Table 27. As another example, it is also possible to set/apply a CDM symbol group size=1 or OCC length=1 for PUCCH format 1 composed of a total of 8 symbols, that is, in a form in which OCC is not applied.

TABLE 27

| | Method 1 | | | | | | | |
|---|---|---|---|---|---|---|---|---|
| | OFDM symbol index | | | | | | | |
| | 0 | 1 | 2 | 3 | 4 | 5 | 6 | 7 |
| UCI (U) or DMRS (R) | R | U | R | U | R | U | R | U |
| OCC element | C0 | C0 | C1 | C1 | C0 | C0 | C1 | C1 |

Figure 13:
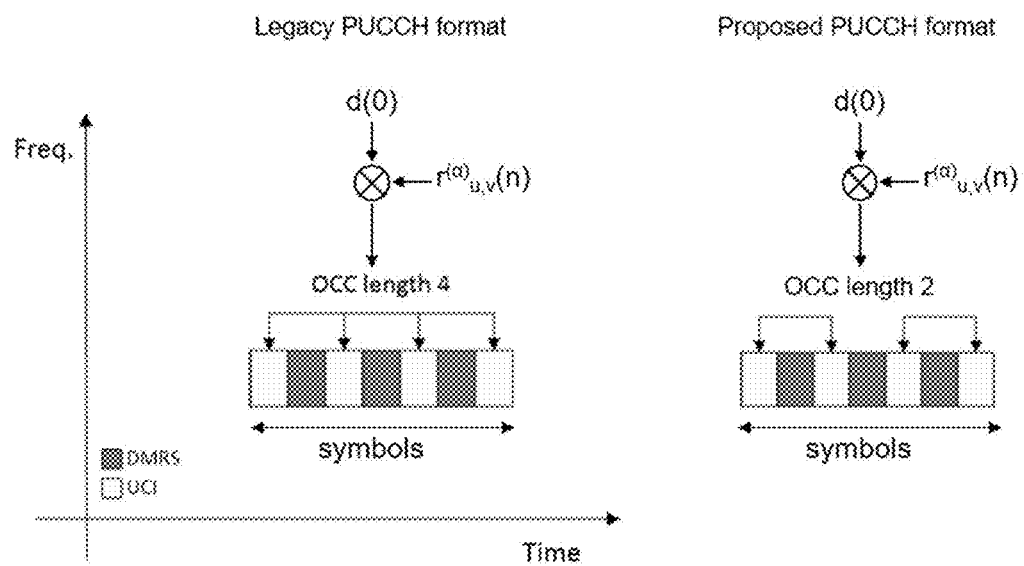

FIG. 13 illustrates signal processing for PUCCH format 1 according to an example of the present invention. FIG. 13 may be understood as a part of S1004 and S1006 of FIG. 10. When a legacy PUCCH format 1 is be used (S1004), a single OCC sequence (to each of the UCI symbol and the DMRS symbol) over the entire PUCCH duration (or, if frequency hopping is configured, each hop duration) (see, Table 26). Meanwhile, when a proposed PUCCH format 1 is used (S1006), (i) CDM symbol group size or (ii) OCC length size may be reduced that the legacy PUCCH format 1 (see, Table 27).

The various descriptions, functions, procedures, proposals, methods, and/or operational flowcharts proposals of the present disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
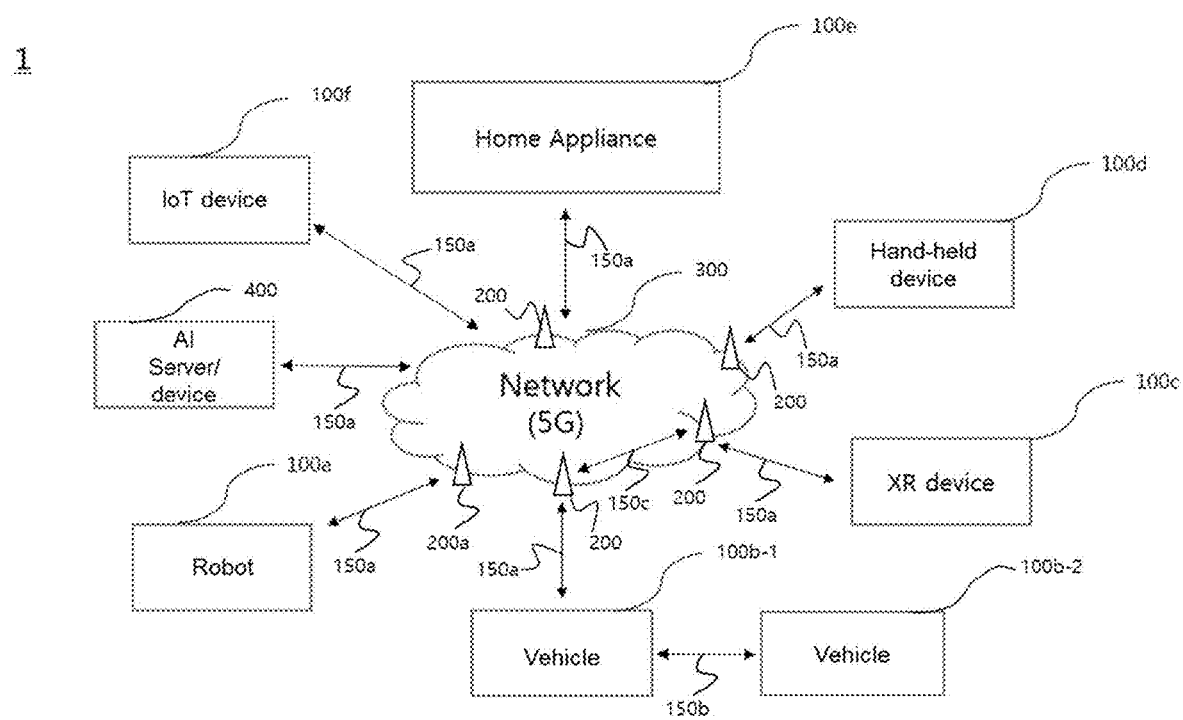
FIGS. 14 to 17 illustrate a communication system 1 and wireless devices, which are applied to the present disclosure.

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
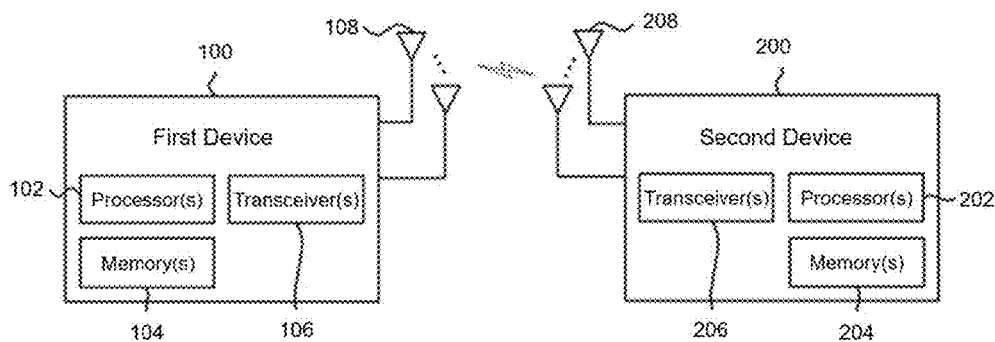

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document.

Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one processor. The at least one computer memory may store instructions or programs which, when executed, cause the at least one processor operably coupled to the at least one memory to perform operations according to some embodiments or implementations of the present disclosure.

Figure 16:
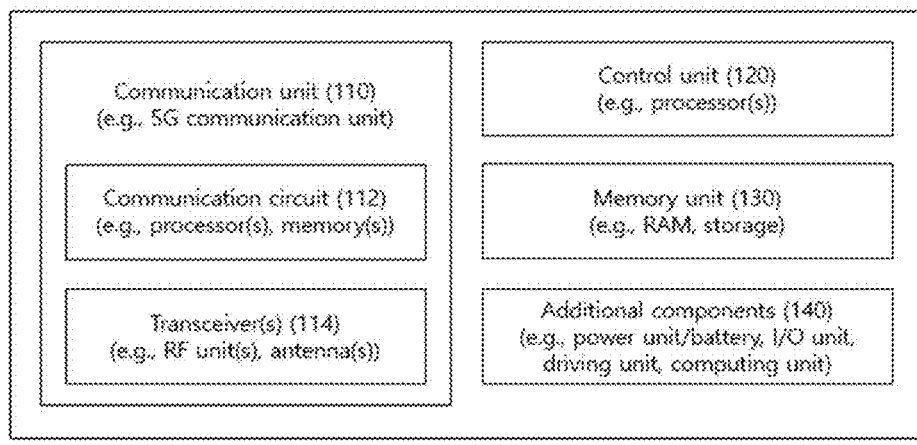

FIG. 16 illustrates another example of a wireless device applied to the present disclosure. The wireless device may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
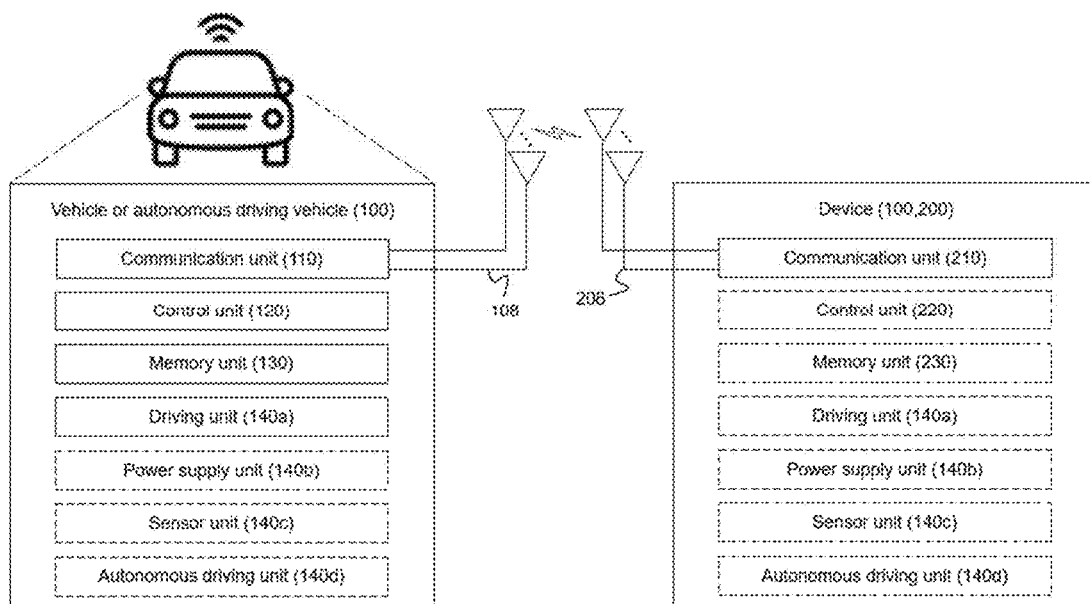

FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

What is claimed is:

1. A method performed by a user equipment (UE) in a wireless communication system, the method comprising:
    multiplexing uplink control information (UCI) symbols and phase tracking reference signal (PTRS) symbols to generate a block of modulation symbols;
    spreading the block of modulation symbols based on an orthogonal sequence with a spreading factor M to provide a length-L spread modulation symbol sequence, wherein the block of modulation symbols comprises L/M modulation symbols, and L is a number 12 of subcarriers in a resource block;
    discrete fourier transforming the length-L spread modulation symbol sequence to provide a length-L complex-valued symbol sequence; and
    transmitting the length-L complex-valued symbol sequence through an orthogonal frequency division multiplexing (OFDM)-based symbol for a physical uplink control channel (PUCCH),
    wherein the length-L spread modulation symbol sequence is configured as follows:

| Index | 0 | 1 | 2 | 3 | 4 | 5 | 6 | 7 | 8 | 9 | 10 | 11 |
|---|---|---|---|---|---|---|---|---|---|---|---|---|
| Symbol | U0 | U1 | R0 | R1 | U2 | U3 | U0 | U1 | R0 | R1 | U2 | U3 |
| OCC element | C0 | C0 | C0 | C0 | C0 | C0 | C1 | C1 | C1 | C1 | C1 | C1 | wherein Ux represents x-th UCI symbol, Rx represent x-th PTRS symbol, and Cx represent x-th element of the orthogonal sequence.

2. A user equipment (UE) configured to operate in a wireless communication system, the UE comprising:
    at least one transceiver;
    at least one processor; and
    at least one computer memory connected to the at least one processor and storing instructions that, when executed by the at least one processor, perform operations comprising:
        multiplexing uplink control information (UCI) symbols and phase tracking reference signal (PTRS) symbols to generate a block of modulation symbols;
        spreading the block of modulation symbols based on an orthogonal sequence with a spreading factor M to provide a length-L spread modulation symbol sequence, wherein the block of modulation symbols comprises L/M modulation symbols, and L is a number 12 of subcarriers in a resource block;
        discrete fourier transforming the length-L spread modulation symbol sequence to provide a length-L complex-valued symbol sequence; and
        transmitting the length-L complex-valued symbol sequence through an orthogonal frequency division multiplexing (OFDM)-based symbol for a physical uplink control channel (PUCCH), wherein the length-L spread modulation symbol sequence is configured as follows:

| Index | 0 | 1 | 2 | 3 | 4 | 5 | 6 | 7 | 8 | 9 | 10 | 11 |
|---|---|---|---|---|---|---|---|---|---|---|---|---|
| Symbol | U0 | U1 | R0 | R1 | U2 | U3 | U0 | U1 | R0 | R1 | U2 | U3 |
| OCC element | C0 | C0 | C0 | C0 | C0 | C0 | C1 | C1 | C1 | C1 | C1 | C1 | wherein Ux represents x-th UCI symbol, Rx represent x-th PTRS symbol, and Cx represent x-th element of the orthogonal sequence.

3. An apparatus for a user equipment (UE), the apparatus comprising:
  at least one processor; and
  at least one computer memory connected to the at least one processor and storing instructions that, when executed by the at least one processor, perform operations comprising:
  multiplexing uplink control information (UCI) symbols and phase tracking reference signal (PTRS) symbols to generate a block of modulation symbols;
  spreading the block of modulation symbols based on an orthogonal sequence with a spreading factor M to provide a length-L spread modulation symbol sequence, wherein the block of modulation symbols comprises L/M modulation symbols, and L is a number 12 of subcarriers in a resource block;
  discrete fourier transforming the length-L spread modulation symbol sequence to provide a length-L complex-valued symbol sequence; and
  transmitting the length-L complex-valued symbol sequence through an orthogonal frequency division multiplexing (OFDM)-based symbol for a physical uplink control channel (PUCCH),
  wherein the length-L spread modulation symbol sequence is configured as follows:

| Index | 0 | 1 | 2 | 3 | 4 | 5 | 6 | 7 | 8 | 9 | 10 | 11 |
|---|---|---|---|---|---|---|---|---|---|---|---|---|
| Symbol | U0 | U1 | R0 | R1 | U2 | U3 | U0 | U1 | R0 | R1 | U2 | U3 |
| OCC element | C0 | C0 | C0 | C0 | C0 | C0 | C1 | C1 | C1 | C1 | C1 | C1 | wherein Ux represents x-th UCI symbol, Rx represent x-th PTRS symbol, and Cx represent x-th element of the orthogonal sequence.

* * * * *